(12) United States Patent
Reed

(10) Patent No.: US 11,260,511 B2
(45) Date of Patent: Mar. 1, 2022

(54) DIAPHRAGM COUPLING TOOLS

(71) Applicant: Goodrich Corporation, Charlotte, NC (US)

(72) Inventor: Brayton Paul Reed, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 211 days.

(21) Appl. No.: 15/710,130

(22) Filed: Sep. 20, 2017

(65) Prior Publication Data

US 2019/0084137 A1 Mar. 21, 2019

(51) Int. Cl.
| | | |
|---|---|---|
| B25B 27/14 | (2006.01) |
| B25B 5/04 | (2006.01) |
| B25B 5/10 | (2006.01) |
| B25B 27/28 | (2006.01) |
| B25B 5/14 | (2006.01) |
| F16D 3/72 | (2006.01) |

(52) U.S. Cl.
CPC ............ B25B 27/14 (2013.01); B25B 5/04 (2013.01); B25B 5/103 (2013.01); B25B 5/14 (2013.01); B25B 27/28 (2013.01); *F16D 3/72* (2013.01); *F16D 2250/0084* (2013.01)

(58) Field of Classification Search
CPC ............ E05D 11/1007; E05D 11/105; E05D 11/1035; E05D 11/1078; B25B 27/14; B25B 5/04; B25B 5/103; B25B 5/14; B25B 27/28
USPC .................................. 29/227; 254/10.5, 126
See application file for complete search history.

(56) References Cited

U.S. PATENT DOCUMENTS

| | | | | |
|---|---|---|---|---|
| 737,360 A | * | 8/1903 | Daly ....................... | B25B 27/26 29/218 |
| 1,051,633 A | * | 1/1913 | Price ....................... | B25B 27/26 29/218 |
| 1,298,934 A | * | 4/1919 | Hale ....................... | B25B 27/26 29/218 |

(Continued)

FOREIGN PATENT DOCUMENTS

| | | |
|---|---|---|
| BE | 517069 A | 2/1953 |
| CN | 106224397 A | 12/2016 |

(Continued)

OTHER PUBLICATIONS

Extended European Search Report dated Feb. 21, 2019, issued during the prosecution of corresponding European Patent Application No. EP 18195411.6.

(Continued)

*Primary Examiner* — Joel D Crandall
(74) *Attorney, Agent, or Firm* — Locke Lord LLP; Joshua L. Jones; Scott D. Wofsy

(57) ABSTRACT

A tool for installation and removal of flexible couplings includes a first plate having a hinge member rigidly extending from the first plate and a shaft engaging feature defined in the first plate opposite the hinge member thereof. A second plate has a hinge member rigidly extending from the second plate and a shaft engaging feature defined in the second plate opposite the hinge member thereof. The hinge members of first and second plates are hinged together for rotation of the first and second plates about a hinge axis to actuate the shaft engaging features toward and away from one another.

16 Claims, 3 Drawing Sheets

(56) References Cited

U.S. PATENT DOCUMENTS

| | | | | |
|---|---|---|---|---|
| 1,929,026 | A | * | 10/1933 | Marcil ................... B25B 27/22 81/15.8 |
| 3,474,519 | A | * | 10/1969 | Hallesy .................. B25B 27/10 29/432 |
| 3,764,107 | A | | 10/1973 | Mlynarczyk |
| 3,912,224 | A | * | 10/1975 | Castoe ................. B25B 27/304 254/10.5 |
| D262,091 | S | * | 12/1981 | Steck ............................ D8/395 |
| 4,334,338 | A | * | 6/1982 | Conn ..................... E05D 7/105 16/266 |
| 4,683,613 | A | * | 8/1987 | Starke .................. E05D 7/1016 16/262 |
| 7,299,704 | B1 | * | 11/2007 | Gerdes ................. F16L 23/003 73/856 |
| 9,494,198 | B2 | | 11/2016 | Nicholas et al. |
| 9,573,259 | B1 | | 2/2017 | Elsasser et al. |
| 2010/0088869 | A1 | * | 4/2010 | Webb ..................... B25B 27/10 29/237 |
| 2013/0037764 | A1 | | 2/2013 | Grivetti |
| 2013/0081523 | A1 | | 4/2013 | Jones et al. |
| 2013/0093184 | A1 | * | 4/2013 | Peirce ..................... B25B 27/10 285/323 |

FOREIGN PATENT DOCUMENTS

| | | | | |
|---|---|---|---|---|
| DE | 29804271 | U1 | * 5/1998 | ........... B25B 27/304 |
| EP | 0501404 | A1 | 9/1992 | |
| GB | 2475840 | B | 9/2012 | |

OTHER PUBLICATIONS

European Communication Pursurant to Art 94(3) EPC dated Oct. 13, 2020, issued during the prosecution of European Patent Application No. 18195411,6.

* cited by examiner

DIAPHRAGM COUPLING TOOLS

BACKGROUND OF THE INVENTION

1. Field of the Invention

The present disclosure relates to flexible couplings, and more particularly to tools for manipulating flexible driveshafts.

2. Description of Related Art

Flexible couplings are commonly used to transmit torque while accommodating axial and/or angular misalignment between driving and driven shaft components along a load path. The flexible couplings generally have stiffness that opposes the angular misalignment accommodated by the flexible coupling. In some flexible couplings, such as flexible couplings with relatively low spring rates, it can be possible to overstress the flexible coupling, either during installation or removal of the flexible coupling. Installation of flexible driveshafts can also be difficult due to support structure and mating part locations, e.g., in fixed-wing and rotary-wing aircraft applications.

The conventional techniques have been considered satisfactory for their intended purpose. However, there is an ever present need for improved tools, e.g., for installation and removal of flexible couplings. This disclosure provides a solution for this need.

SUMMARY OF THE INVENTION

A tool for installation and removal of flexible couplings includes a first plate having a hinge member rigidly extending from the first plate and a shaft engaging feature defined in the first plate opposite the hinge member thereof. A second plate has a hinge member rigidly extending from the second plate and a shaft engaging feature defined in the second plate opposite the hinge member thereof. The hinge members of first and second plates are hinged together for rotation of the first and second plates about a hinge axis to actuate the shaft engaging features toward and away from one another.

Each shaft engaging feature can include a u-shaped cut out between two respective tines of the respective first or second plate. Each u-shaped cut out can define a u-shaped edge of the plate that is itself contoured wrapping around the u-shaped edge to provide an interface for a secure fit between the plates and a flexible driveshaft to reduce or eliminate damage to a flexible drive shaft interfacing with the shaft engaging features.

The hinge member of the first plate can include a pair of spaced apart protrusions extending from the first plate. The hinge member of the second plate can include a pair of spaced apart protrusions extending from the second plate. The hinge member of the first plate can include at least one keyed pivot member extending along the hinge axis. The hinge member of the second plate can define a keyed bore extending along the pivot axis. The keyed pivot member and the keyed bore can be configured to keep the hinge members of the first and second plates handedly engaged for rotation about the hinge axis, and for disengagement of the first and second plates along the hinge axis by aligning a key of the keyed pivot member with a keyway of the keyed bore.

Each of the first plate and the second plate can include a respective actuation feature for engagement of an actuator to the first and second plates for actuating the shaft engaging features toward and away from one another. The actuation feature of the first plate can include an actuator bore through the first plate. The actuation feature of the second plate can include an actuation bore through the second plate. The actuation bores of the first plate and the second plate are aligned with one another for passage of an actuation bolt therethrough.

A kit for a tool for installation and removal of flexible couplings includes a first plate as described and second plate as described above. The hinge members of first and second plates are configured to be hinged together for rotation of the first and second plates about a hinge axis to actuate the shaft engaging features toward and away from one another.

A method of manipulating a flexible coupling for installation and/or removal includes engaging a tool as described above to a flexible driveshaft. The method also includes actuating the shaft engaging features toward one another to compress the flexible driveshaft axially along a longitudinal axis of the flexible driveshaft. Actuating the shaft engaging features toward one another can include engaging a threaded bolt through respective actuation bores in the first plate and the second plate, and driving a threaded nut around the threaded bolt to drive the shaft engaging features toward one another. The method can include assembling the first and second plates together by engaging keyed pivot members of the first plate with keyed bores of the second plate.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
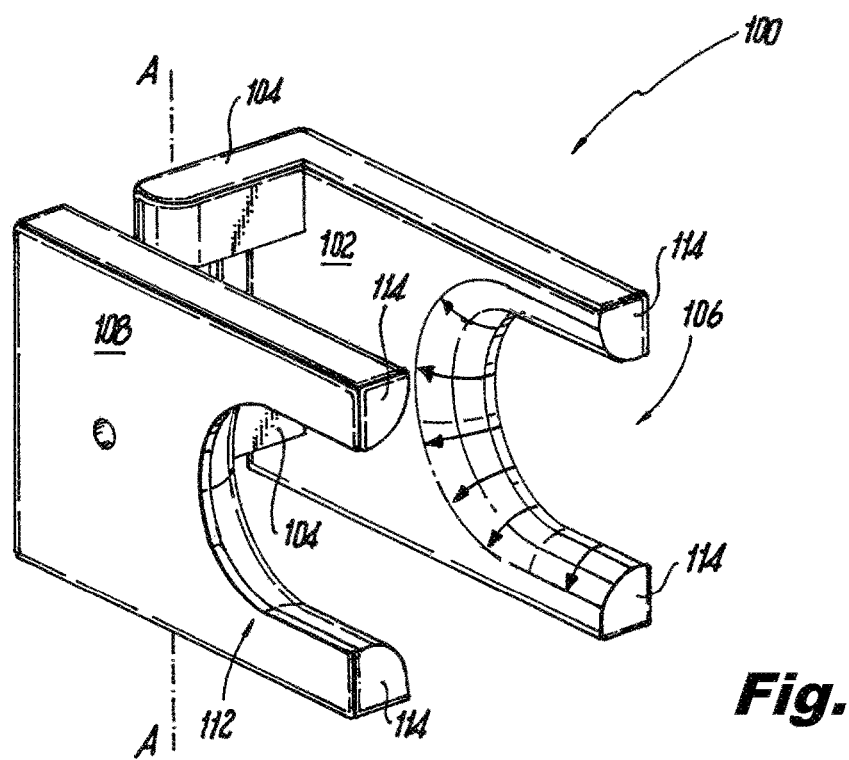
FIG. 1 is a perspective view of an exemplary embodiment of a tool constructed in accordance with the present disclosure, showing the two plates.

Reference will now be made to the drawings wherein like reference numerals identify similar structural features or aspects of the subject disclosure. For purposes of explanation and illustration, and not limitation, a partial view of an exemplary embodiment of a tool in accordance with the disclosure is shown in FIG. 1 and is designated generally by reference character 100. Other embodiments of tools in accordance with the disclosure, or aspects thereof, are provided in FIGS. 2-5, as will be described. The systems and methods described herein can be used to facilitate installation and removal of flexible driveshafts such as in fixed-wing and rotary wing aircraft applications.

The tool 100 includes a first plate 102 having a hinge member 104 rigidly extending from the first plate 102. A shaft engaging feature 106 is defined in the first plate 102 opposite the hinge member 104 thereof. A second plate 108 has a hinge member 110 (see also in FIG. 2) rigidly extending from the second plate 108. A shaft engaging feature 112 is defined in the second plate 108 opposite the hinge member 110 thereof. The hinge members 104 and 110 of first and second plates 102 and 108 are hinged together for rotation of the first and second plates 102 and 108 about a hinge axis A to actuate the shaft engaging features 106 and 112 toward and away from one another.

With continued reference to FIG. 1, each shaft engaging feature 106 and 112 includes a u-shaped cut out between two respective tines 114 of the respective first or second plate 102 or 108. Each u-shaped cut out defines a u-shaped edge 116 of the plate 102 or 108 that is itself contoured wrapping around the u-shaped edge 116 to provide an interface for a secure fit between the plates 102 and 108 and a flexible driveshaft 118, shown in FIG. 5, to reduce or eliminate damage to the flexible drive shaft 118 when interfacing with the shaft engaging features 106 and 112. The contour that wraps around the u-shaped edges 116 is curved around the u-shaped edges 116 in the direction indicated by the curved arrows in FIGS. 1 and 2.

Figure 2:
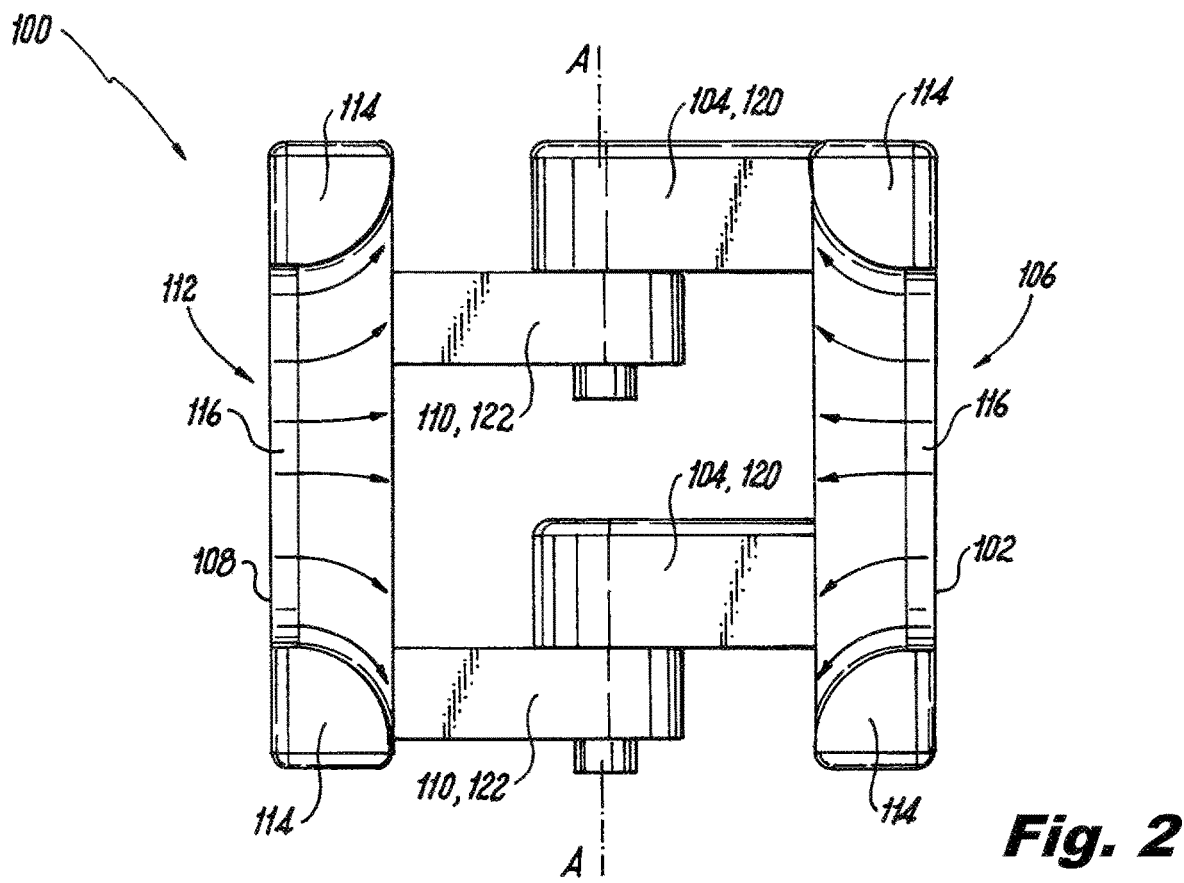
FIG. 2 is an end elevation view of the tool of FIG. 1, showing the hinge members.
Figure 4:
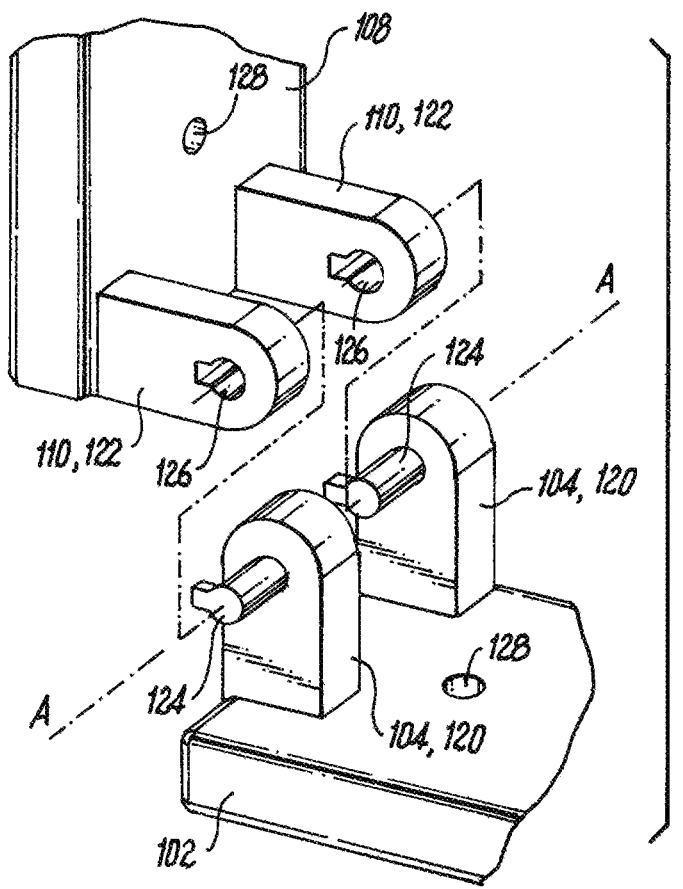
FIG. 4 is an exploded perspective view of the tool of FIG. 1, showing the first and second plates separated.

With reference now to FIG. 2, the hinge member 104 of the first plate 102 includes a pair protrusions 120 spaced apart from one another along axis A and extending rigidly, e.g. monolithically, from the first plate 102. Similarly, the hinge member 110 of the second plate includes a pair of protrusions 122 that are spaced apart along the axis A and that extend rigidly from the second plate 108. As shown in FIG. 4, the hinge member 104 includes a set of two keyed pivot members 124 extending along the hinge axis A. The hinge member 110 defines a corresponding pair of keyed bores 126 extending along the pivot axis A. The keyed pivot members 124 and the keyed bores 126 are configured to keep the hinge members 104 and 110 of the first and second plates 102 and 108 handedly engaged for rotation about the hinge axis A, and for engagement/disengagement of the first and second plates 102 and 108 along the hinge axis A by aligning the keys of the keyed pivot members 124 with the respective keyways of the keyed bores 126 (i.e. the plates 102 and 108 can be rotated to the position shown in FIG. 4 to align the keys and keyways to allow the plates 102 and 108 to be engaged together by axially sliding the hinge members 104 and 110 together along axis A, and the similar process can be used to disengage plates 102 and 108).

Figure 3:
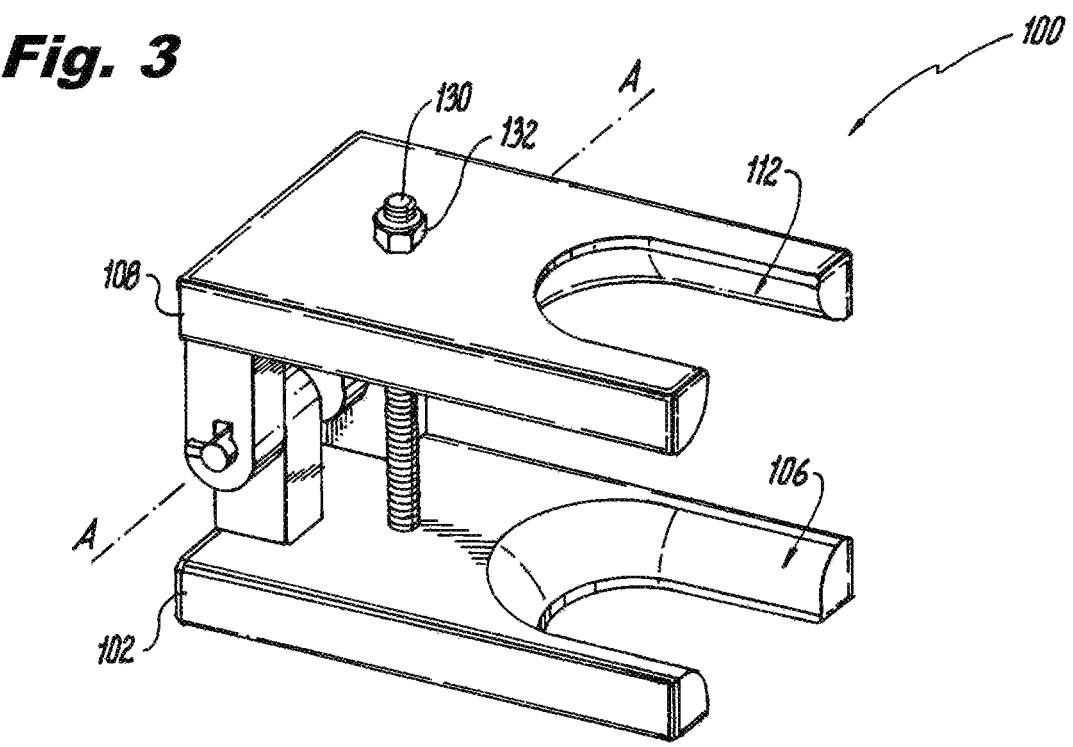
FIG. 3 is a perspective view of the tool of FIG. 1, showing the actuator bolt and nut.
Figure 5:
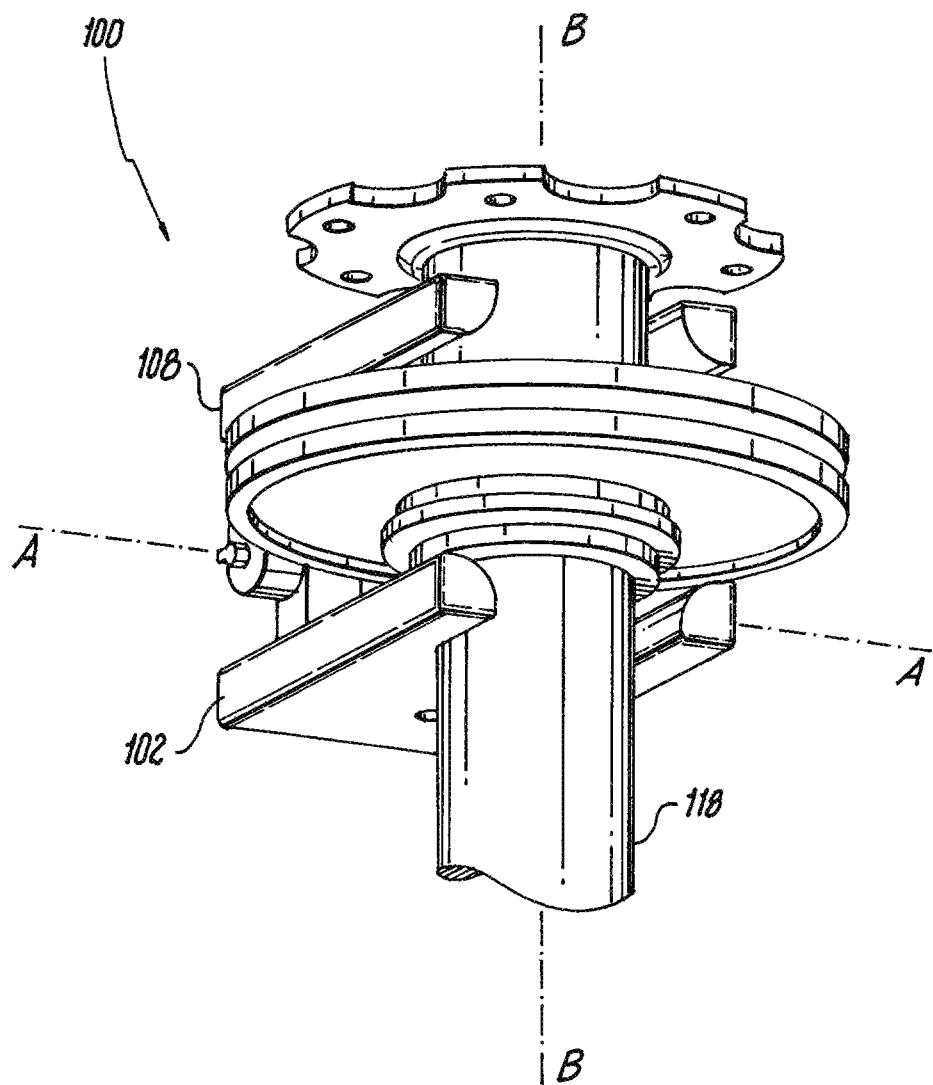
FIG. 5 is a perspective view of the tool of FIG. 1, showing the tool engaged with a flexible diaphragm shaft.

With reference now to FIG. 3, each of the first plate 102 and the second plate 108 includes a respective actuation feature 128 (both of which are visible in FIG. 4) for engagement of an actuator to the first and second plates 102 and 108 for actuating the shaft engaging features 106 and 112 toward and away from one another. The actuation features 128 of the first plate and second plates 102 and 108 include respective actuator bores through the first and second plates 102 and 108. The actuation bores are aligned with one another for passage of an actuation bolt 130 therethrough when the first and second plates 102 and 108 are positioned as shown in FIG. 3. The nut 132 on actuator bolt 130 can be tightened to drive the shaft engaging features 106 and 112 closer together, i.e., to compress a flexible drive shaft 118 along its longitudinal axis B as shown in FIG. 5 for installation in an assembly, and can be loosened to allow the shaft engaging features 106 and 112 to expand apart, e.g., allowing the diaphragm of the flexible shaft 118 to expand along axis B as after installing the flexible drive shaft 118 in an assembly.

Tools and methods as disclosed herein can be used on any installation where compression of the diaphragm couplings is beneficial. Tools and methods as described herein can fully collapse a flexible coupling. This can be used to assist in installation, ensure safe transport, and assist in inspection. Creating a uniform compression of the coupling at the hub location is very difficult without tools and methods as described herein. During installation of components that include male pilots there traditionally has had to be unique geometry/features (splines, separable assemblies, shims) to allow installation without damaging flexible elements. Tools and methods as disclosed herein allow the compression of these flexible diaphragms which alleviates the need for the aforementioned unique features for installation of components. Some couplings have very high spring rates and are unable to be compressed by hand without a tool. Some couplings have very low spring rates and if not properly handled can be damaged by simple handling. Fully compressing the couplings prevents damage due to over-stretching and over-flexing of the unit. There are installation applications that have internal fastening hardware (bolts on the inside of the coupling). Inspecting these fasteners is difficult without disassembling the entire drive system. Tools and methods disclosed herein make any fastener that does not have clamping force holding the coupling in place visually apparent—the coupling will move and a gap will appear at the interface that the internal fastener is creating. The use of single fastener at the actuator can ensure that there is little chance of foreign object debris (FOD), while providing reliable and repeatable clamping force. The fastener can be standard hardware that is readily available, such as a National Aerospace Standard (NAS) bolt and nut.

The methods and systems of the present disclosure, as described above and shown in the drawings, provide for installation and removal of flexible couplings with superior properties including ease of use and reduction and/or prevention of damage. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A tool for installation and removal of flexible couplings comprising:
    a first plate having,
        a hinge member rigidly extending from the first plate;
        a shaft engaging feature defined in the first plate opposite the hinge member thereof;
        a first surface; and
        an opposed second surface; and
    a second plate having,
        a hinge member rigidly extending from the second plate;
        a shaft engaging feature defined in the second plate opposite the hinge member thereof;
        a first surface; and
        an opposed second surface,
    wherein the hinge members of first and second plates are hinged together for rotation of the first and second plates about a hinge axis to actuate the shaft engaging features toward and away from one another,
    wherein each shaft engaging feature includes a u-shaped cut out between two respective tines of the respective first or second plate, wherein each u-shaped cut out defines a u-shaped edge of the plate that is itself contoured wrapping around the u-shaped edge, defining a contour that curves around the u-shaped edge, to provide an interface for a secure fit between the plates and a flexible driveshaft to reduce or eliminate damage to a flexible drive shaft interfacing with the shaft engaging features, wherein the contour on the first plate starts perpendicular to the first surface of the first plate and curves convexly to be tangent with the second surface of the first plate, wherein the contour on the second plate starts perpendicular to the first surface of the second plate and curves convexly to be tangent with the second surface of the second plate.

2. The tool as recited in claim 1, wherein the hinge member of the first plate includes a pair of spaced apart protrusions extending from the first plate.

3. The tool as recited in claim 1, wherein the hinge member of the second plate includes a pair of spaced apart protrusions extending from the second plate.

4. The tool as recited in claim 1, wherein the hinge member of the first plate includes at least one keyed pivot member extending along the hinge axis, and wherein the hinge member of the second plate defines a keyed bore extending along the pivot axis, wherein the keyed pivot member and the keyed bore are configured to keep the hinge members of the first and second plates handedly engaged for rotation about the hinge axis, and for disengagement of the first and second plates along the hinge axis by aligning a key of the keyed pivot member with a keyway of the keyed bore.

5. The tool as recited in claim 1, wherein each of the first plate and the second plate includes a respective actuation feature for engagement of an actuator to the first and second plates for actuating the shaft engaging features toward and away from one another.

6. The tool as recited in claim 5, wherein the actuation feature of the first plate includes an actuator bore through the first plate, wherein the actuation feature of the second plate includes an actuation bore through the second plate, and wherein the actuation bores of the first plate and the second plate are aligned with one another for passage of an actuation bolt therethrough.

7. A kit for a tool for installation and removal of flexible couplings comprising:
a first plate having,
a hinge member rigidly extending from the first plate-;
a shaft engaging feature defined in the first plate opposite the hinge member thereof;
a first surface; and
an opposed second surface; and
a second plate having,
a hinge member rigidly extending from the second plate-;
a shaft engaging feature defined in the second plate opposite the hinge member thereof,
a first surface; and
an opposed second surface;
wherein the hinge members of first and second plates are configured to be hinged together for rotation of the first and second plates about a hinge axis to actuate the shaft engaging features toward and away from one another,
wherein each shaft engaging feature includes a u-shaped cut out between two respective tines of the respective first or second plate, wherein each u-shaped cut out defines a u-shaped edge of the plate that is itself contoured wrapping around the u-shaped edge, defining a contour that curves around the u-shaped edge, to provide an interface for a secure face between the plates and a flexible driveshaft to reduce or eliminate damage to a flexible drive shaft interfacing with the shaft engaging features, wherein the contour on the first plate starts perpendicular to the first surface of the first plate and curves convexly to be tangent with the second surface of the first plate, wherein the contour on the second plate starts perpendicular to the first surface of the second plate and curves convexly to be tangent with the second surface of the second plate.

8. The kit as recited in claim 7, wherein the hinge member of the first plate includes a pair of spaced apart protrusions extending from the first plate.

9. The kit as recited in claim 7, wherein the hinge member of the second plate includes a pair of spaced apart protrusions extending from the second plate.

10. The kit as recited in claim 7, wherein the hinge member of the first plate includes at least one keyed pivot member extending along the hinge axis, and wherein the hinge member of the second plate defines a keyed bore extending along the pivot axis, wherein the keyed pivot member and the keyed bore are configured to keep the hinge members of the first and second plates handedly engaged for rotation about the hinge axis, and for disengagement of the first and second plates along the hinge axis by aligning a key of the keyed pivot member with a keyway of the keyed bore.

11. The kit as recited in claim 7, wherein each of the first plate and the second plate includes a respective actuation feature for engagement of an actuator to the first and second plates for actuating the shaft engaging features toward and away from one another.

12. The kit as recited in claim 11, wherein the actuation feature of the first plate includes an actuator bore through the first plate, wherein the actuation feature of the second plate includes an actuation bore through the second plate, and wherein the actuation bores of the first plate and the second plate are aligned with one another for passage of an actuation bolt therethrough.

13. The kit as recited in claim 7, wherein the contour of each shaft-engaging-feature includes a convex portion that is curved convexly about a direction from the first surface to the second surface, wherein the convex portion extends around a majority of the shaft-engaging-feature in a direction from the first surface to the second surface.

14. The kit as recited in claim 13, wherein the contour includes a first tine on one end of the u-shaped cut out, and a second tine on a second end, wherein the first and second tines include a portion of the shaft-engaging-feature that is convex from the first to the second surface, but is straight relative to the curve of the u-shape.

15. The tool as recited in claim 1, wherein the contour of each shaft-engaging-feature includes a convex portion that is curved convexly about a direction from the first surface to thesecond-surface, wherein the convex portion extends around a majority of the shaft-engaging-feature in a direction from the first surface to the second surface.

16. The tool as recited in claim 15, wherein the contour includes a first tine on one end of the u-shaped cut out, and a second tine on a second end, wherein the first and second tines include a portion of the shaft-engaging-feature that is convex from the first to the second surface, but is straight relative to the curve of the u-shape.

* * * * *